J. G. A. KITCHEN.
RESILIENT TIRE.
APPLICATION FILED MAR. 11, 1911.
993,306.
Patented May 23, 1911.
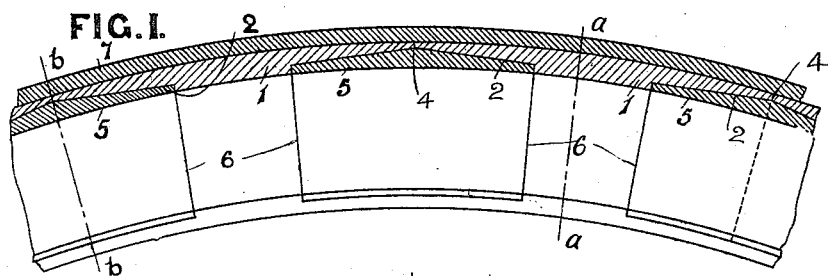
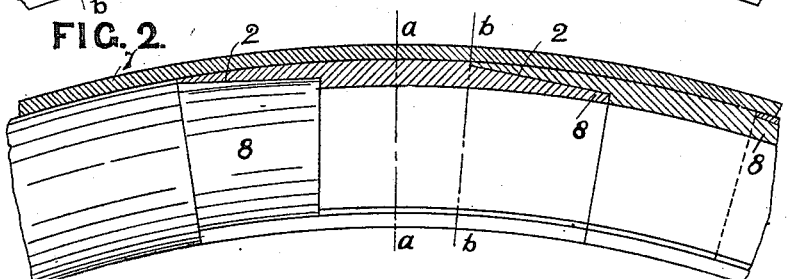
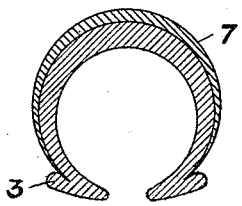
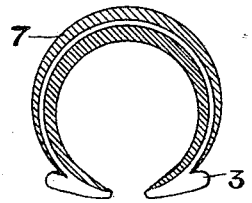
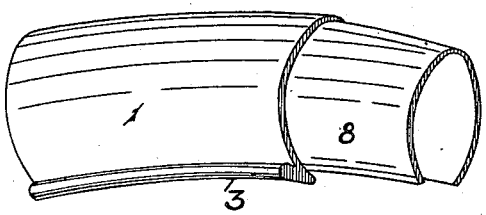
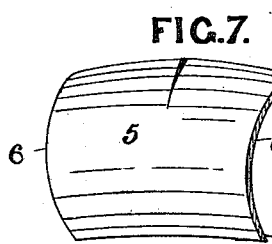
Witnesses:
Inventor
John G. A. Kitchen,
By B. Singer
Attorney.

UNITED STATES PATENT OFFICE.

JOHN GEORGE AULSEBROOK KITCHEN, OF SCOTFORTH, LANCASTER, ENGLAND.

RESILIENT TIRE.

993,306.

Specification of Letters Patent.  Patented May 23, 1911.

Application filed March 11, 1911. Serial No. 613,695.

*To all whom it may concern:*

Be it known that I, JOHN GEORGE AULSEBROOK KITCHEN, a subject of the King of the United Kingdom of Great Britain and Ireland, and resident of Scotforth, Lancaster, in the county of Lancaster, England, have invented certain new and useful Improvements in Resilient Tires, of which the following is a specification.

This invention relates to improvements in the manufacture of resilient tires, having a jacket or cover formed of india rubber and fabric and a pneumatic chamber or other elastic core.

Hitherto it has been customary to build up the tire covers upon annular formers of the size of the core, from strips of rubbered fabric laid in plies continuously around the former and afterward to apply the india-rubber tread part, the whole being finally vulcanized in a mold or while bound upon the former with spirally wound wrappings. It is difficult to properly repair tire covers so made when from undue wear or other causes a defect appears in the fabric foundation, which generally necessitates the tire being discarded. Pneumatic tires have also been made with jackets or covers formed of separate unattached segments of india rubber and fabric formed with the tread part. These are not uniform in strength and at present more expensive to manufacture as they require to be of heavier construction than continuous covers.

The object of this invention is to build up a continuous tire jacket in such a manner that a proper repair can easily be made, without leaving the jacket weaker in one part than another and to facilitate the manufacture of such tires.

According to this invention the fabric foundation of the cover is built up of separate sections, each of which is first formed complete without the india rubber tread part. The segments are then first cemented together on a former and an india rubber covering or tread part in one piece is applied and cemented to the segments, the cement used in both cases being an unvulcanizable solution. The whole may then be vulcanized in the known way.

In the drawings Figure 1 represents a longitudinal section of a part of a tire constructed according to my invention; Fig. 2 a similar view of a slightly modified construction; Fig. 3 represents a cross section at line *a, a* of Figs. 1 and 2, Fig. 4 a cross section at line *b, b,* of the same figures; Fig. 5 represents an elevation of one of the segments of the tire illustrated by Fig. 2, and Figs. 6 and 7 represent elevations of the segment (external and internal) and liner of the tire illustrated by Fig. 1.

The pneumatic tube or other elastic core is not shown in the drawing.

Referring first to the tire represented by Fig. 1, the segments are indicated by 1, Figs. 1 and 6, and are constructed of india rubber proofed layers of fabric built up in the known way. The ends of each segment are internally recessed, or coned as shown at 2, and have beaded edges 3 adapted to fit the rim of the wheel. The segments are butted together at 4. Internally are fitted other segments 5 having reduced or tapered ends 6 which fit the coned ends of the sections, the bore of the inner segments being the same as that of the outer segments so that the internal surface of the complete tire is smooth. These inner and outer segments form the base of the tire. They may be conveniently built up upon an annular former. The segments may be separately vulcanized or partly vulcanized before being built up into a tire. The tire is built up upon the former, of the segments described, the several parts being coated where they join together with unvulcanizable solution. After the foundation so made is complete, a continuous or an endless band 7 of india rubber previously vulcanized or otherwise is secured to and around the outer segments by unvulcanizable solution while on the former. When the segments and the tread covering are not completely vulcanized beforehand, the built up tire is vulcanized in the known way while on the former.

Referring to the tire illustrated in Fig. 2, each segment 1 is formed with a spigot 8 at one end and a coned mouth 2 at the other end. These segments are fitted together upon a former, and the tread part 7 of vulcanized or partly vulcanized india rubber is applied, the parts being cemented together as in the previously described case with unvulcanizable solution. Fig. 5 represents the complete segment.

The reduced or tapered ends of the segments and the recessed or internally coned ends thereof are obtained by longer or shorter lengths of fabric layers in building up the segments.

When the tire becomes damaged the tread part can be pulled off and the respective segment pulled out, as the solution being unvulcanizable, remains in a viscous state. The damage can then be repaired and the parts replaced after being covered with solution where they join.

What I claim as my invention and desire to secure by Letters Patent is:—

A jacket for a resilient tire consisting of a number of vulcanized segments of rubber coated fabric fitting into one another at their ends to form an endless sheath of uniform cross section, and of a vulcanized india-rubber thread part surrounding said sheath, the segments being cemented to each other and the tread part with unvulcanizable india-rubber solution, as and for the purpose set forth.

In testimony whereof I have hereunto set my hand in the presence of two witnesses.

JOHN GEORGE AULSEBROOK KITCHEN.

Witnesses:
JAMES RITCHIE,
PERCY IRELAND.

---

Copies of this patent may be obtained for five cents each, by addressing the "Commissioner of Patents, Washington, D. C."